United States Patent [19]

Schukei

[11] Patent Number: 4,682,630
[45] Date of Patent: * Jul. 28, 1987

[54] HIGH PRESSURE NOZZLE DAM

[75] Inventor: Glen E. Schukei, South Windsor, Conn.

[73] Assignee: Combustion Engineering, Inc., Windsor, Conn.

[*] Notice: The portion of the term of this patent subsequent to Nov. 20, 2001 has been disclaimed.

[21] Appl. No.: 639,564

[22] Filed: Aug. 10, 1984

[51] Int. Cl.⁴ .............................................. F16L 55/12
[52] U.S. Cl. ........................................ 138/89; 138/93; 220/232; 376/204
[58] Field of Search .................... 138/89, 93; 220/232; 277/34; 376/204, 203, 205, 206, 451

[56] References Cited

U.S. PATENT DOCUMENTS 2,843,154  7/1958  Hosking .
3,834,422  9/1974  Larson .
4,482,076 11/1984  Wentzell .
4,483,457 11/1984  Schukei et al. .
4,518,015  5/1985  Fischer .

Primary Examiner—James E. Bryant, III
Attorney, Agent, or Firm—John H. Mulholland

[57] ABSTRACT

A nozzle between the nuclear steam generator and nuclear reactor vessel has a dam, plug, or barrier mounted on the tapering internal wall of the conduit. A seating ring is mounted on the tapered internal surface of the nozzle through screws which will ensure release of the ring after pressure on the dam is removed, and the screws are backed away from engagement with the tapered surface.

4 Claims, 3 Drawing Figures 4,682,630

HIGH PRESSURE NOZZLE DAM

TECHNICAL FIELD

The present invention relates to plug, stopper, or dam structures in an internally tapered conduit. More particularly, the invention relates to a plug, stopper, or dam structure for the output conduit from a nuclear steam generator.

BACKGROUND ART

It is the hope that a nuclear generator of electrical energy will operate without interruption; however, this goal has not yet been realized. The reactor installation must be periodically shut down in order to perform maintenance, replacements, and repairs. One of the subsystems of the nuclear installation is the conduit connection between the reactor vessel and the steam generator. The fluid level of the reactor vessel is cycled up and down to service the core of the reactor. At the same time, the steam generator must be decontaminated of radioactive material.

To decontaminate the steam generator, a temporary plug or dam is required in the outlet conduit from the steam generator connected to the reactor vessel. It is to be assumed that personnel may enter the generator water (or plenum) chamber through a manway which is usually about 16" in diameter. From this chamber the outlet conduit has an opening of about 30" in diameter and about a foot of the length of the internal wall of the conduit tapers in the direction of the reactor vessel. None of the plug structures in the present art have been satisfactory to isolate the reactor from the steam generator for decontamination purposes. More specifically, the prior art devices do not provide the flexibility required to seal between the dam structure and the irregularity of the internal wall of the conduit.

DISCLOSURE OF THE INVENTION

The present invention contemplates a metallic ring positioned in the internal taper of the conduit connecting the generator and reactor vessel. A dome-shaped dam is inserted in the tapered conduit to uniformly engage the ring mounted in the tapered section of the conduit.

Further the invention contemplates threaded extensions at spaced intervals around the ring to engage the internally tapered surface of the nozzle which will accept extreme pressures from the plenum chamber and can be subsequently backed away to release the ring for manual removal.

The invention further contemplates the dome-shaped dam is formed in at least three sections hinged together and covered by an elastomeric diaphragm which precludes leakage between the hinged sections.

The invention further contemplates flexible air-sustained seals mounted between the diaphragm and the irregular wall of the conduit.

Other objects, advantages and features of this invention will become apparent to one skilled in the art upon consideration of the written specification, appended claims, and attached drawings.

BRIEF DESIGNATION OF THE DRAWINGS

BEST MODE FOR CARRYING OUT THE INVENTION

Figure 1:
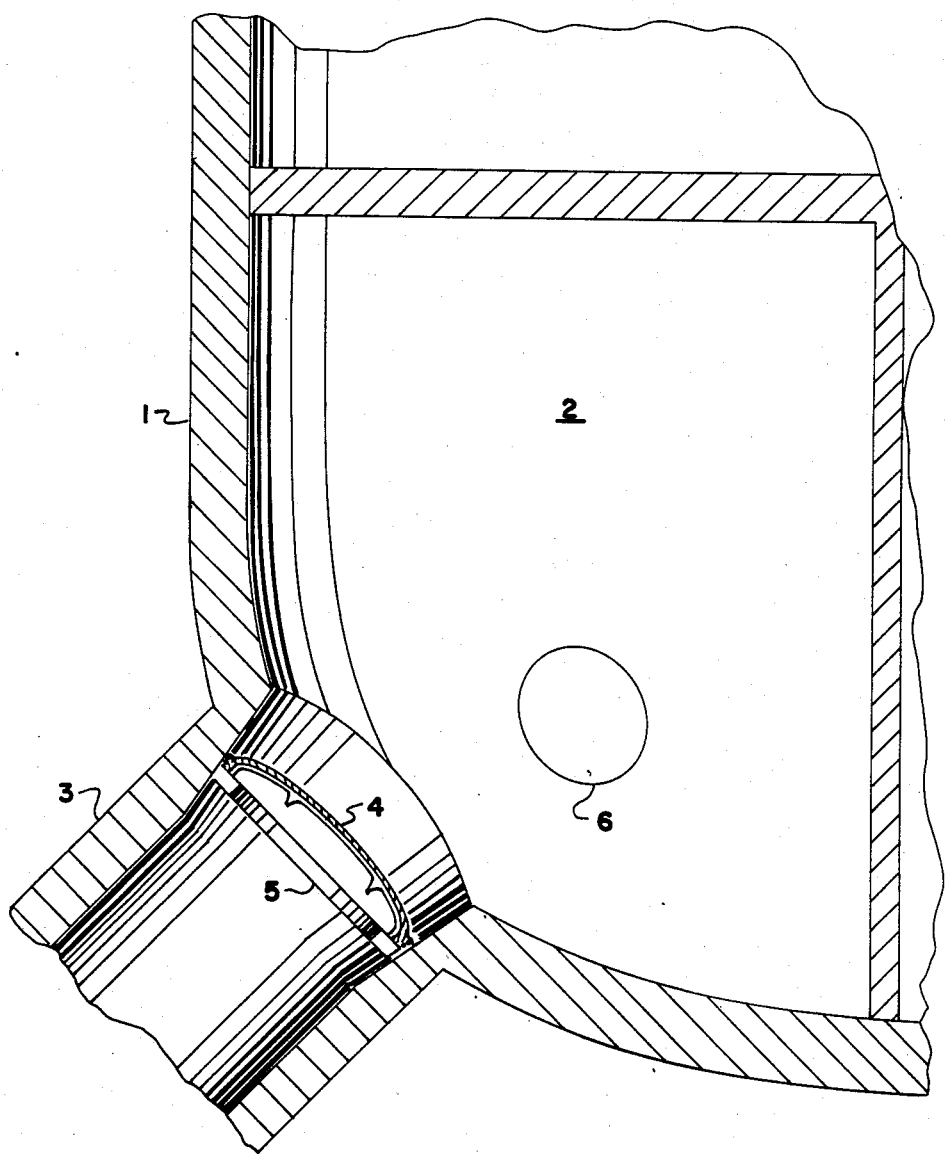
FIG. 1 is a sectioned elevation disclosing a portion of a nuclear steam generator having its outlet to the reactor sealed by structure embodying the present invention.

Referring to the drawings, FIG. 1 discloses the principal structural elements which embody the invention. A portion of the steam generator is shown in an elevated section in FIG. 1. Specifically, shell 1 of the generator is disclosed in the area of the outlet chamber 2. Conduit 3 penetrates shell 1 to communicate with chamber 2 and forms an opening through which the contents of chamber 2 is discharged to the nuclear reactor vessel, not shown. The entry into conduit 3 tapers from a large diameter portion to a small diameter portion for about one foot of the length of the conduit toward the reactor vessel.

During decontamination of the lower compartments and tubes of the steam generator, an effective closure of outlet conduit 3 must be provided. The decontamination procedure is expected to have an extreme pressure within the chambers and tubes and this decontamination fluid must be isolated from the nuclear reactor vessel to which conduit 3 connects. A dam 4 is provided to effectively resist the extreme pressure of the decontaminating fluid and withstand a low pressure generated from the reactor vessel. In FIG. 1, dam 4 is seated on a ring or dam stop 5 and formed as a dome toward the large diameter portion of the taper and the high pressure of chamber 2. Manway 6 is provided in the wall of the steam generator which will readily accommodate personnel entering generator compartment 2 for access to the dam location in conduit 3.

Figure 2:
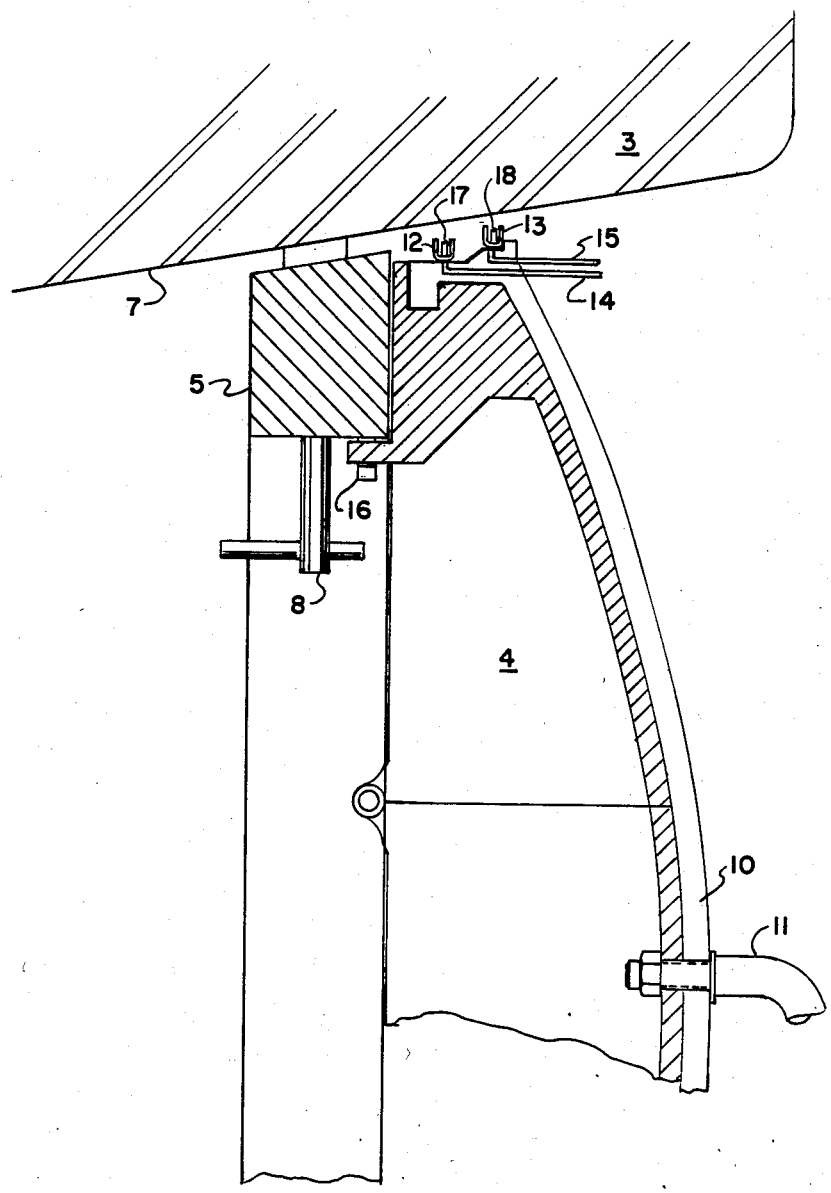
FIG. 2 is a sectioned elevation of the mounting of the dam on the stop or ring structure.

In FIG. 2, proper sectioning has been given this elevation in order to examine additional features of dam structure 4 and ring or dam stop 5. Conduit 3 is shown in section and its internal wall 7 is tapered toward the left of the FIG. 2 view. The ring or dam stop 5 is wedged against tapered wall 7, and dam 4 seats upon the surface of the stop. The dam is formed in at least three sections hinged together so it can be passed through manway 6 and placed in conduit 3 as shown in FIG. 2. Ring or dam stop 5 does not come into direct contact with tapered wall 7. Around the periphery of the ring or dam stop, a series of release screws 8 are provided and are adjusted to cause serrated feet on the ends of the screws to be extended beyond the outside diameter of the ring. When the ring is seated, each release screw 8 is tightened to hold the ring in this position. No more than one or two turns should be required. The release screws are added because of the magnitude of the force anticipated on the dam structure. The screw extensions will be wedged into the tapered wall 7, but by releasing each screw a couple of turns, the wedging action will be released so the dam stop can be removed by hand.

Dam 4 is in rigid sections hinged together so it can be inserted through manway 6 and installed. The dam has a hemispherical head facing the steam generator to withstand the high pressures. A diaphragm 10 is attached to the center section of the dam by handles 11. The outer section of the diaphragm or seal is thickened and shaped so that it will "snap" into place and be held onto the dam structure. Two independent, inflatable seals 12 and 13 are positioned on the periphery of diaphragm 10. Pressurization tubes 14 and 15, for inflating each seal 12,13, are brought out to the surface of the seal or diaphragm 10. The tubes are connected through check valves and quick connects to a source of fluid pressure, not shown. A step on the diaphragm allows the pressurization tubes to be let out to the front of the seal under the top seal. It also provides compensation for the change and irregularity in diameter of the internal nozzle surface and adds rigidity to the seal. Inflatable seals 12,13 allow for diameter variations of one inch or more. Since the dam stop effectively locates the dam in the taper at a preselected diameter, the ability to seal such a large diameter variation should be quite adequate. Sealing extrusions 17 and 18 on the inflatable seals allow for a low durometer elastomer to be used for this "foot" to obtain a seal over extremely irregular surfaces at relatively low seal pressures.

The dam structure has clips 16 attached to set it in place against the dam stop, then rotated a short distance to mate with lugs on the dam stop or ring. These clips will keep the dam from being expelled into the head if a small pressure should occur on the reactor side, i.e. a wave from starting the safety injection pump.

Figure 3:
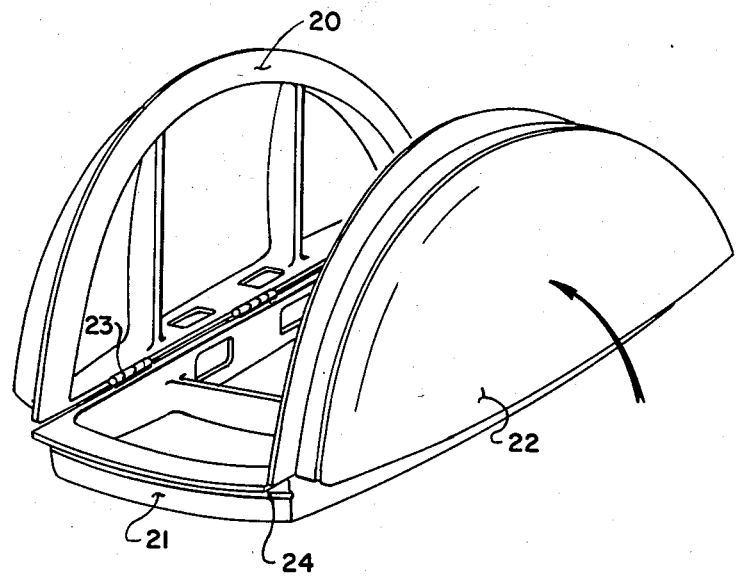
FIG. 3 is an isometric of the foldable dam.

FIG. 3 discloses the folded dam structure 4. The dam, probably constructed of aluminum, has three parts 20, 21 and 22, which are hinged together at 23 and 24. It is necessary to pass the dam through manway 6 and into compartment 2. Then, within compartment 2, the three sections of the dam can be unfolded into the dome configuration disclosed in the preceding figures. Once unfolded, the dome structure can be placed upon the ring or dam stop 5 by the use of handles 11.

From the foregoing, it will be seen that this invention is one well adapted to attain all the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

I claim:

1. A dam for mounting in an internally tapered surface of an adjacent conduit having a large diameter portion and a small diameter portion through which fluids flow, including:
   a metallic ring positioned at the tapered surface on a plane at right angles to the axis of the conduit;
   a dam structure formed of rigid hinged sections and including a dome positioned on the surface of the ring with the dome extending toward the large diameter portion of the tapered surface; and
   a plurality of release screws spaced around the ring and extending beyond the outside diameter of the ring into engagement with the internally tapered surface of the conduit to maintain a space between the ring and the tapered surface to allow release and removal of the ring after the screws have been wedged into the surface of the conduit by extreme pressure on the dam.

2. The dam structure of claim 1, including:
   at least two separately inflatable seals at the periphery of the dam structure of a low durometer eleastomer to create a seal over the tapered surface of the conduit and any irregularities present therein at relatively low seal pressure.

3. The dam structure of claim 1 including;
   a diaphragm of elastomeric material fitted over the dome secured by a portion of the diaphragm at the edge of the dome; and
   handles mounted through the diaphragm and dome to aid manual removal of the dam from the ring.

4. The dam of claim 1 including;
   lug structures evenly spaced around the ring to engage clips on the dam and form a bayonet engagement as the dam is rotated on the surface of the ring.

* * * * *